US012658585B2

(12) United States Patent
Camp et al.

(10) Patent No.: US 12,658,585 B2
(45) Date of Patent: Jun. 16, 2026

(54) REACTIVELY DRIVEN DIPOLE ANTENNA

(71) Applicants: James Thomas Camp, Colonial Beach, VA (US); Douglas Mark Wilson, King George, VA (US); Joseph Adam Gibson, Montross, VA (US)

(72) Inventors: James Thomas Camp, Colonial Beach, VA (US); Douglas Mark Wilson, King George, VA (US); Joseph Adam Gibson, Montross, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 438 days.

(21) Appl. No.: 18/079,559

(22) Filed: Dec. 12, 2022

(65) Prior Publication Data

US 2024/0195068 A1 Jun. 13, 2024

(51) Int. Cl.
*H01Q 7/00* (2006.01)
*H01Q 1/36* (2006.01)

(52) U.S. Cl.
CPC ............... *H01Q 7/005* (2013.01); *H01Q 1/36* (2013.01)

(58) Field of Classification Search
CPC ............ H01Q 7/00; H01Q 7/005; H01Q 1/36; H01Q 9/27; H01Q 9/265
See application file for complete search history.

(56) References Cited

U.S. PATENT DOCUMENTS

| | | | | |
|---|---|---|---|---|
| 9,634,730 | B2 * | 4/2017 | Cook | H02J 50/23 |
| 2012/0062434 | A1 * | 3/2012 | Kim | H01Q 7/005 343/749 |
| 2013/0038281 | A1 * | 2/2013 | Sakakibara | B60L 53/122 320/108 |
| 2018/0062250 | A1 * | 3/2018 | Lavin | H01Q 1/286 |
| 2018/0204672 | A1 * | 7/2018 | Mendoza Aguirre | H01F 17/0006 |
| 2019/0140701 | A1 * | 5/2019 | Greason | G06K 7/10336 |
| 2020/0006857 | A1 * | 1/2020 | Kelley | H01Q 1/38 |

* cited by examiner

*Primary Examiner* — Thai Pham
(74) *Attorney, Agent, or Firm* — Gerhard W. Thielman

(57) ABSTRACT

A capacitively or inductively driven spiral antenna creates an electric current distribution of a dipole, which generates a sensible magnetic field for various military applications including detecting and pre-detonating improvised explosive devices (IEDs). The antenna includes a dielectric substrate, a spiral antenna, driving elements such as tuning forks or loop, and a coaxial cable that connects to a source terminal. The substrate is a low dielectric loss insulating material to provide support for the antenna. The spiral antenna is tuned to a natural frequency is disposed on the substrate. The coaxial cable extends from the substrate to the source terminal.

5 Claims, 12 Drawing Sheets

$$f_b = \frac{c}{4 \cdot L} \cdot (2 \cdot b - 1)$$

$$f_b = \frac{c}{4 \cdot L} \cdot (2 \cdot b)$$

$B_{\Phi}$: Uniform Current $$I(a)=\sin\left[\pi\cdot b\cdot\frac{a}{L}\cdot\cos\cdot\left[\frac{\pi}{F}\left(\frac{L-a}{L}\right)\right]^2\right]$$

$B_{\Phi}$: Non-uniform Current $$B_{\Phi}=\int_{-L/2}^{L/2}\frac{\mu_a\cdot I(a)}{4\cdot\pi}\left(\frac{i\cdot k}{r''}+\frac{1}{r''^2}\right)\cdot\sin(\theta'')\cdot e^{-i\cdot k\cdot r''}\cdot da$$

REACTIVELY DRIVEN DIPOLE ANTENNA

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to spiral antennas with the current distribution of a dipole driven capacitively or inductively by a small dipole or loop, also referred to as tuning forks. In particular, the invention relates to spiral antennas for reactive field applications.

SUMMARY

Conventional high frequency (HF) antennas yield disadvantages addressed by various exemplary embodiments of the present invention. In particular, various exemplary embodiments provide a spiral antenna with a dipole current distribution for various reactive field applications.

The spiral antenna connects to a source reactively by means of a small geometrically adjustable dipole or loop, also referred to as tuning forks. A dielectric substrate provides support for the antenna. The antenna includes a dielectric substrate, a spiral antenna, driving elements such as tuning forks or loop, and a coaxial cable that connects to a source terminal.

The substrate is a low dielectric loss insulating material to provide support for the antenna. The spiral antenna is tuned to a natural frequency is disposed on the substrate. The coaxial cable extends from the substrate to the source terminal. The natural frequency of the spiral antenna depends on the length of the spiral, dielectric of the substrate, and disposition of the tuning forks.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m), mass in grams (g), time in seconds (s), angles in degrees (°), force in newtons (N), temperature in kelvins (K), electric current in amperes (A), resistance in ohms (Ω), magnetic field in teslas (T), energy in joules (J) and frequencies in gigahertz (GHz). Supplemental measures can be derived from these, such as density in grams-per-cubic-centimeters ($g/cm^3$), moment of inertia in gram-square-centimeters ($kg\text{-}m^2$) and the like.

The development of the antenna began in 2015 as part of a Naval Surface Warfare Center Dahlgren Division (NSWCDD) effort to disable targets non-invasively using the reactive field component of an antenna, specifically the magnetic field. Remote charging of batteries, such as a reconnaissance drone in the field can also be considered. Dahlgren engineers have experimented with two classes of antennas: open and closed loop.

Figure 1A:
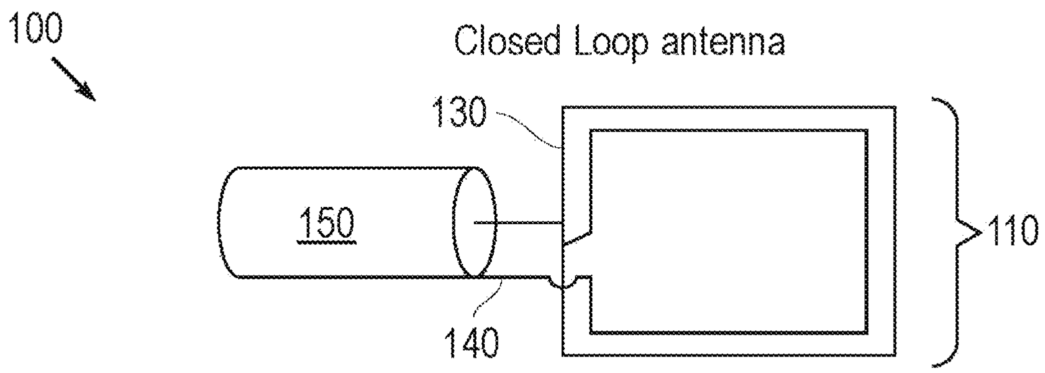
FIG. 1A RELATED ART
FIGS. 1A and 1B are diagram views of antenna circuits.
Figure 1B:
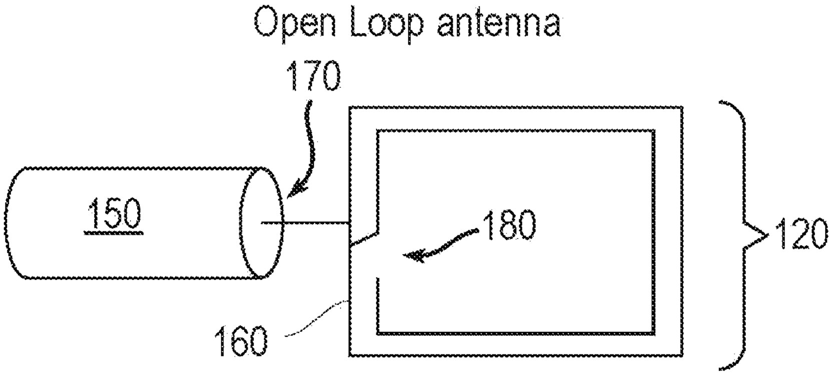
FIG. 1B RELATED ART

FIGS. 1A and 1B show a schematic views 100 of a closed loop antenna 110 and an open loop antenna 120. The closed loop antenna 110 includes a spiral wire loop 130 connecting to the outer conductor 140 of a coaxial cable 150. The open loop antenna 120 includes a spiral wire loop 160 (substantially identical to the loop 130) starting at the cable 150 from a lead 170 and ending at an empty terminal 180. This constitutes a monopole antenna in a spiral configuration.

The closed loop antenna 110 exhibits a natural frequency $f_b$ behavior expressed as:

$$f_b = \frac{c}{4L} \cdot (2b - 1), \tag{1}$$

where c is the speed of light in a vacuum, L is spiral length, b is an integer denoting the harmonic. Only the primary frequency b=1 is of any practical use for the original intent of this antenna. The open loop antenna 120 exhibits the same behaviour as:

$$f_b = \frac{c}{4L} \cdot 2b. \tag{2}$$

The open loop antenna 120 produces a much stronger magnetic field compared to the closed loop antenna due to its more favorable current distribution. The open loop distribution resembles a quarter-wave monopole (as opposed to the full-wave dipole current distribution of the closed loop, which places a node of zero current in the middle of the antenna). This induced magnetic field can have sufficient strength to be sensible to conventional intensity measuring instruments.

Figure 2:
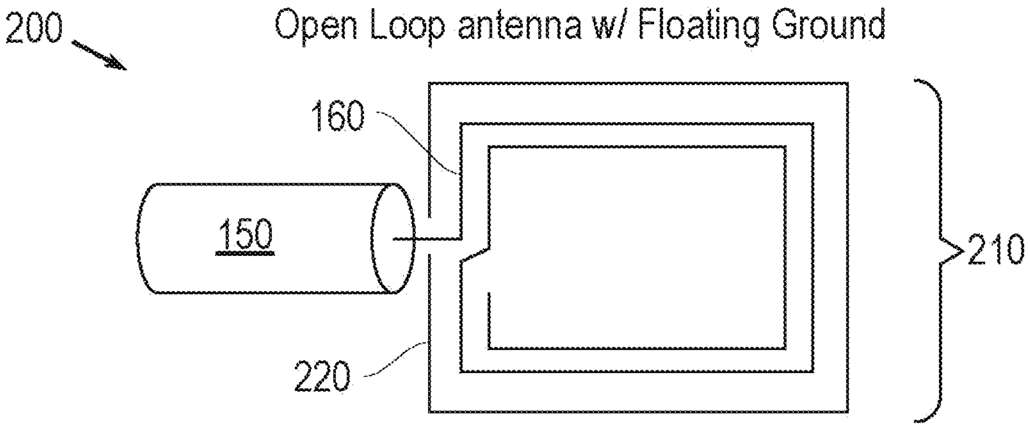
FIG. 2 is a diagram view of an antenna circuit with floating ground.

FIG. 2 shows a schematic view 200 of a modified open loop antenna 210 with floating ground. The loop 160 connecting to the cable 150 inductively drives the floating ground 220, which produces a second frequency defined by the length of the floating ground. This configuration has the advantage of radiating two frequencies, each defined by the length of their respective loops. Additionally, the floating ground 220 has the more favorable current distribution of a dipole antenna, thus creating a stronger magnetic field. The floating antenna 210 is the basis behind exemplary embodiments.

The resonant frequencies of these antennas depend on their length L. However, only the primary frequency b=1 is of any practical use. The open loop antenna 160 produced a much stronger magnetic field compared to the closed loop antenna due to its more favorable current distribution resembling a quarter-wave monopole.

This open loop configuration has advantages over the full-wave dipole current distribution of the closed loop, which imposes a node of zero current in the middle of the antenna 130. In order to obtain a second effective frequency, engineers added a "floating ground" loop 220 around the outside of the main antenna 160 in assembly 210. This floating ground 220 inductively coupled to the main antenna 160, which resulted in a current distribution similar to a dipole antenna.

Figure 3:
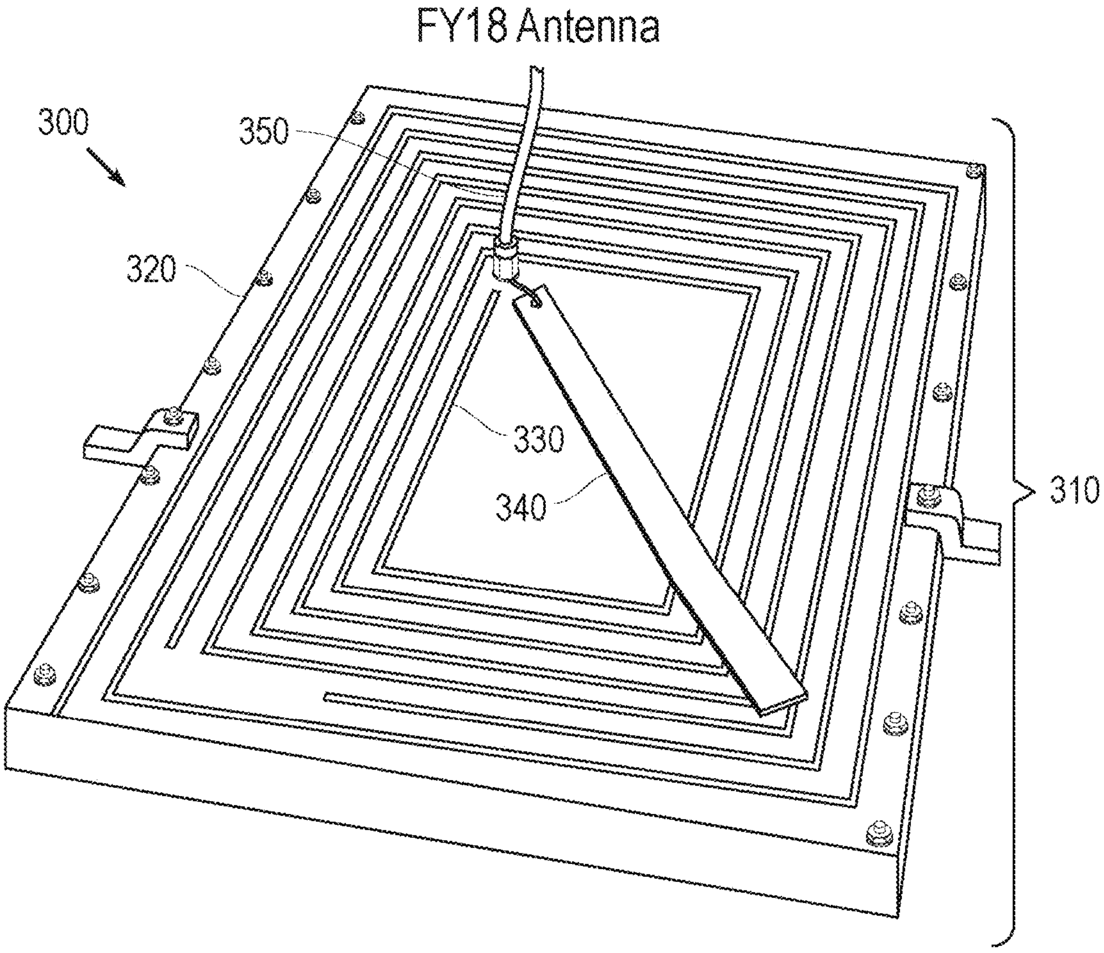
FIG. 3 is a photographic view of a prototype rectangular spiral antenna.

FIG. 3 shows a photographic view 300 of this floating antenna 210 as the antenna's physical assembly 310 as designed, built and integrated in 2018 as a test system to disable targets non-invasively. A polycarbonate plate 320 supports the entire antenna structure, which includes a rectangular floating ground loop 330 (analogous to wire loop 220) that winds outward counter-clockwise. The wire loop can comprise aluminum (Al), or else another electrically conductive metal, such as copper (Cu) or silver (Ag).

A flange 340 provides structural support for a 50Ω coaxial cable 350 (analogous to schematic cable 150). The group loop 330 connects to the coaxial cable 350 that attaches to an electrical source. The ground loop plate 320 on the outside of the main antenna 310 adds a second effective frequency to the antenna structure.

The spiral closed loop antenna 330 was very effective against its designated targets. However, it was not without its shortcomings. The impedance of the closed loop antenna 330 was very sensitive to the movement of the coaxial feed cable 350, in addition to the setup and placement of the cable's balun. Interestingly, engineers observed the impedance of the floating ground loop 320 had little dependency on the cable 350 and balun and decided to exploit this behavior for the design of a primary antenna.

Figures 4A, 4B:
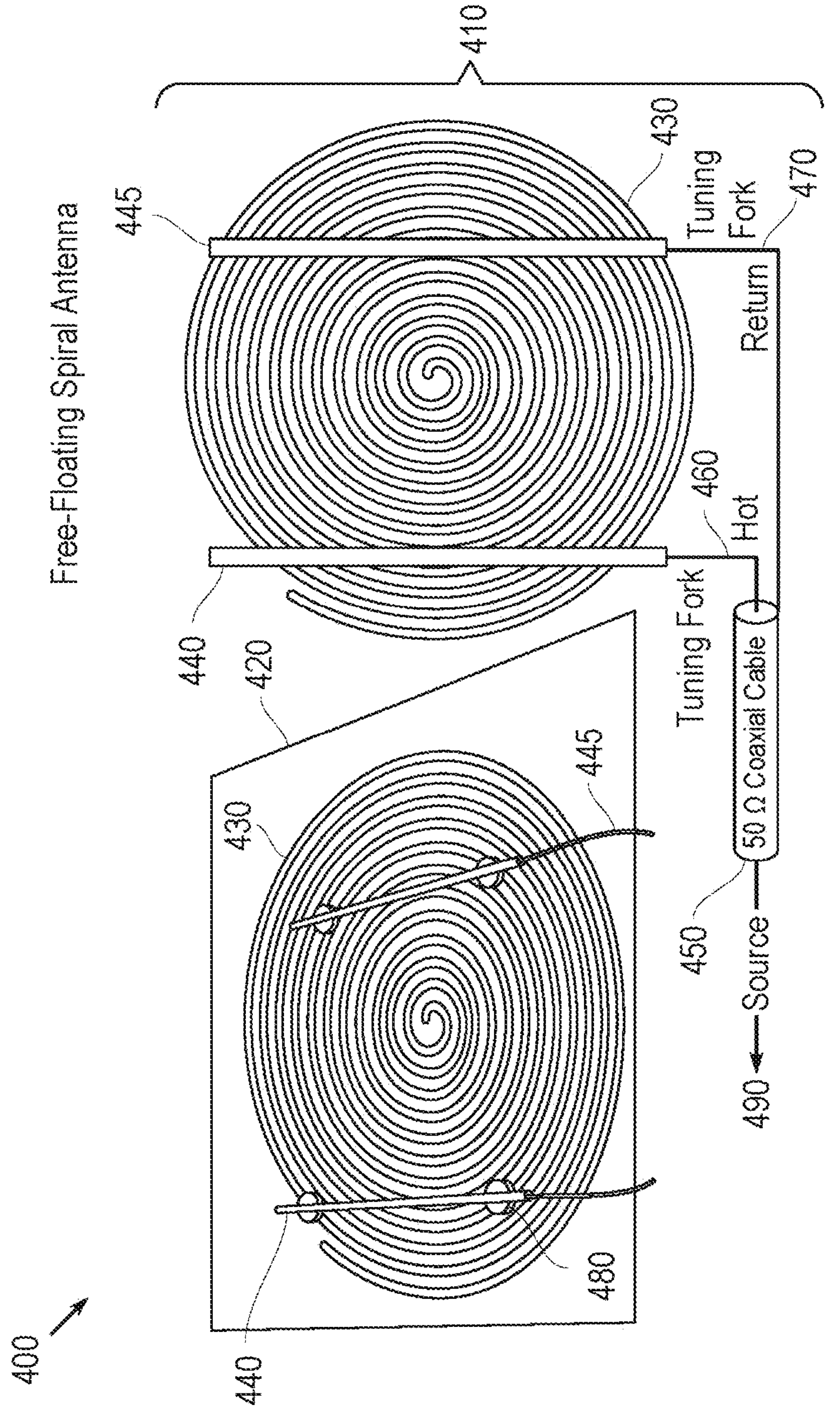
FIGS. 4A and 4B are photographic and plan design views of an exemplary circular spiral antenna.

FIGS. 4A and 4B show perspective and plan views 400 respectively of a free floating spiral antenna assembly 410. A dielectric plate 420 supports the spiral antenna 430 that winds outwardly clockwise. A pair of dipole electrodes 440 and 445 connect to a 50Ω coaxial cable 450 (analogous to schematic cable 150) at the hot conduit 460 and the return ground 470 at the proximal juncture.

The forks 440 and 445 are isolated from the antenna 430 by dielectric spacers 480, and capacitively drive the spiral antenna 410. Similarly, a loop such as spiral antenna 430 proximate to the coaxial cable 450 can inductively drive the spiral antenna assembly 410 at the same frequency. A signal source 490 (e.g., amplifier, signal generator) connects to the cable 450 at the distal end. The antenna 430 can be driven either capacitively or inductively.

Figure 5:
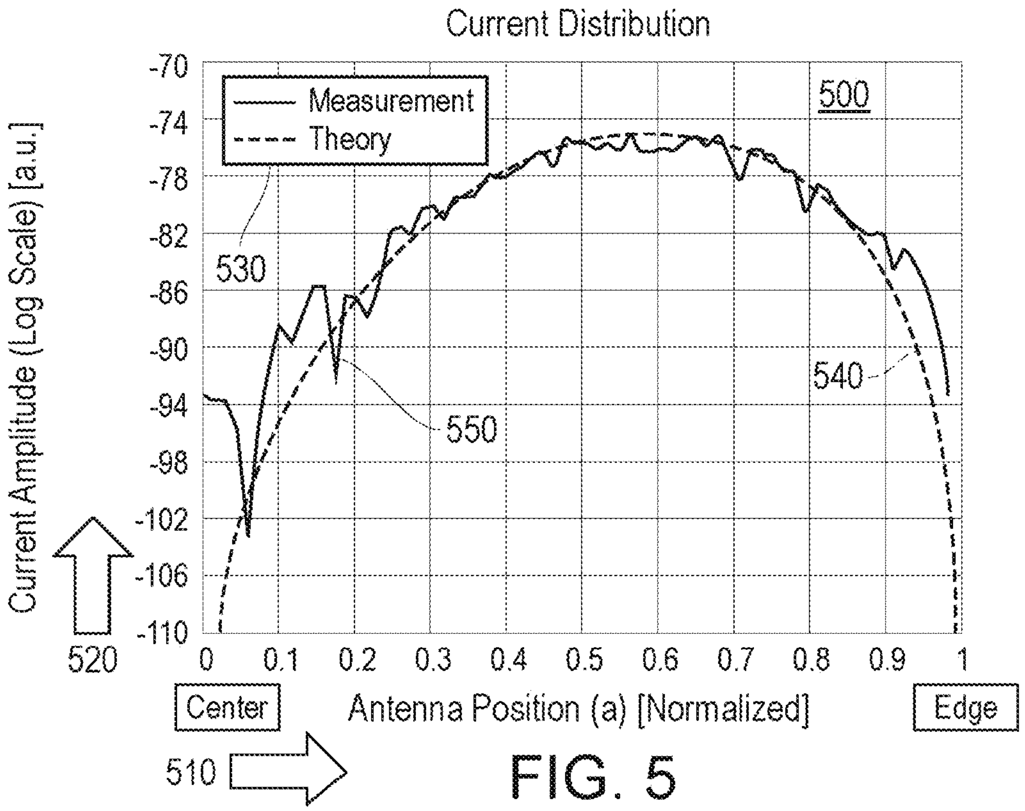
FIG. 5 is a graphical view of gain response to relative position along an antenna length.
Figure 6:
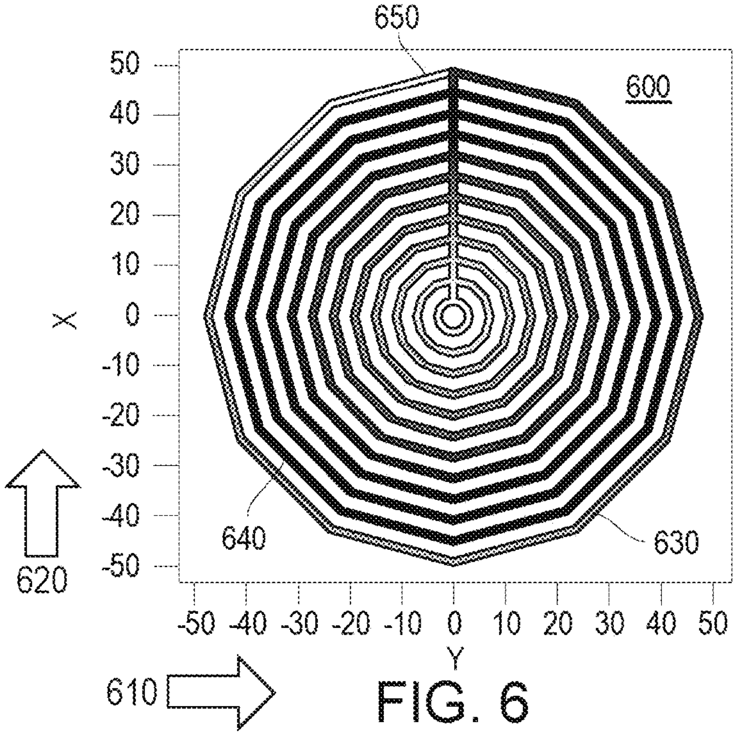
FIG. 6 is a graphical view of a topology of current amplitude on a circular spiral antenna.

FIG. 5 shows a graphical view 500 of electric current distribution. Normalized antenna position 510 represents the abscissa, while current amplitude 520 (logarithmic arbitrary units) denotes the ordinate. A legend 530 identifies theory 540 as a dash curve and measurement 550 as a series of solid lines. Theory 540 presents a hump anchored at the antenna ends, and measurement 550 follows with erratic effects. The current diminishes towards the ends, and reaches a maximum at about 0.6 of the overall length. FIG. 6 shows a graphical view 600 of the topology of the current amplitude 520 on a circular spiral antenna 430. The Y axis 610 and the X axis 620 denote abscissa and ordinate respectively.

Figure 7A:
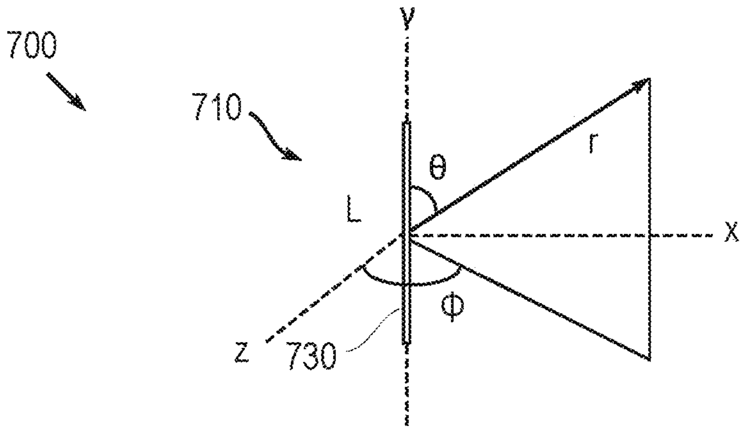
FIGS. 7A and 7B are diagram views of magnetic vector response to electric current.
Figure 7B:
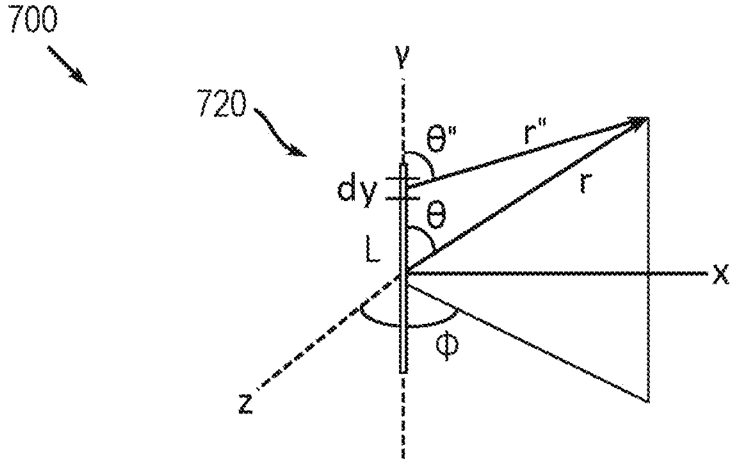

FIGS. 7A and 7B show coordinate system views 700 of uniform 710 and non-uniform current 720 for modeling magnetic field around an antenna. Along a segment length L of wire 730 along the Y axis in a Cartesian coordinate system of uniform current 710, the current projects along the direction of a vector defined in the XY plane by angle θ and in the XZ plane by angle ø from the midsection of the wire segment.

By reducing the length region of consideration from L to dy, the effective radius reduces to shifted radius r", while the XY plane angle reduces to angle θ". Electric current I(a) is determined by:

$$I(a) = \sin\left[\pi \cdot b \cdot \frac{a}{L} \cdot \cos\left[\frac{\pi}{F} \cdot \left(\frac{L-a}{L}\right)\right]^2\right], \qquad (3)$$

where α is relative position along the antenna length, and b is the harmonic integer and F is a dimensionless fitting constant that depends on the geometry of the antenna, but generally has a value around three.

The non-uniform magnetic field $B_\phi$ in view 720 is expressed as:

$$B_\phi = \int_{-L/2}^{L/2} \frac{\mu_0 \cdot I(a)}{4\pi} \cdot \left(\frac{i \cdot k}{r''} + \frac{1}{(r'')^2}\right) \cdot \sin(\theta'') \cdot e^{-i \cdot k \cdot r''} \cdot da, \qquad (4)$$

where $\mu_0 \approx 1.257 \times 10^{-6}$ N/A$^2$ is vacuum permeability, r" is truncated distance, $i=\sqrt{-1}$ is the imaginary number, k is the wave number (2π/λ) as the inverse of wavelength, and θ" is the truncated angle.

Figure 8:
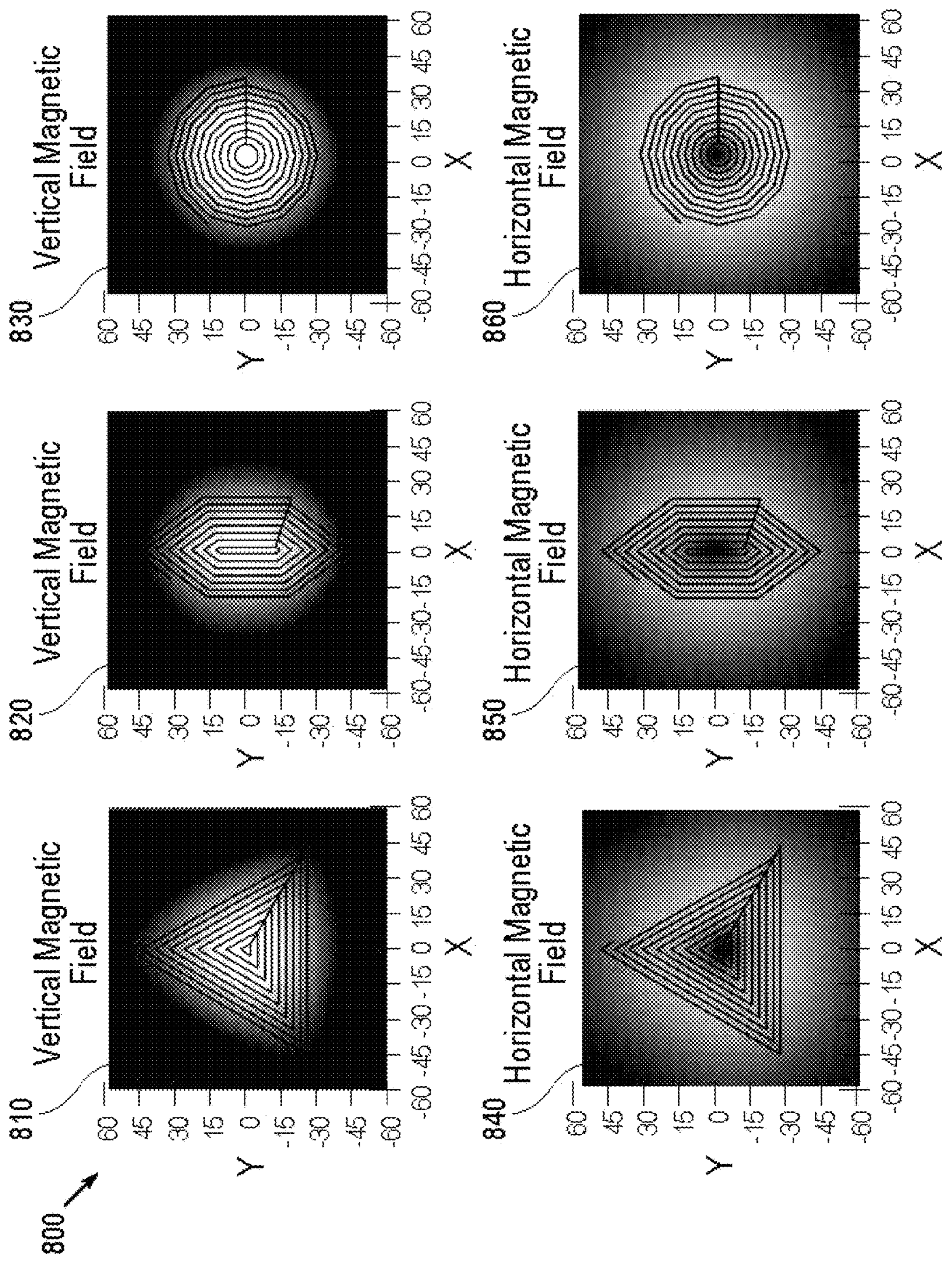
FIG. 8 is a set of photographic views of spiral antenna responses to vertical and horizontal magnetic fields comparing geometries.

FIG. 8 shows a plan view 800 of three separate spiral antenna geometric configurations of triangular, elongated hexagonal, and circular spiral geometries showing theoretical responses to vertical and horizontal magnetic fields as photographic images 810, 820, 830, 840, 850 and 860. The triangle vertical and horizontal images respectively correspond to 810 and 840. The hexagon vertical and horizontal images respectively correspond to 820 and 850. The circle vertical and horizontal images respectively correspond to 830 and 860.

The difference in density of the light field surrounded by a dark background demonstrates the sensible strength of the magnetic field. As can be observed, the vertical images 810, 820 and 830 illustrate more concentrated and intense brighter regions at their centers than the corresponding horizontal images 840, 850 and 860, indicating higher effectiveness in the normal direction over lateral directions.

Figure 9:
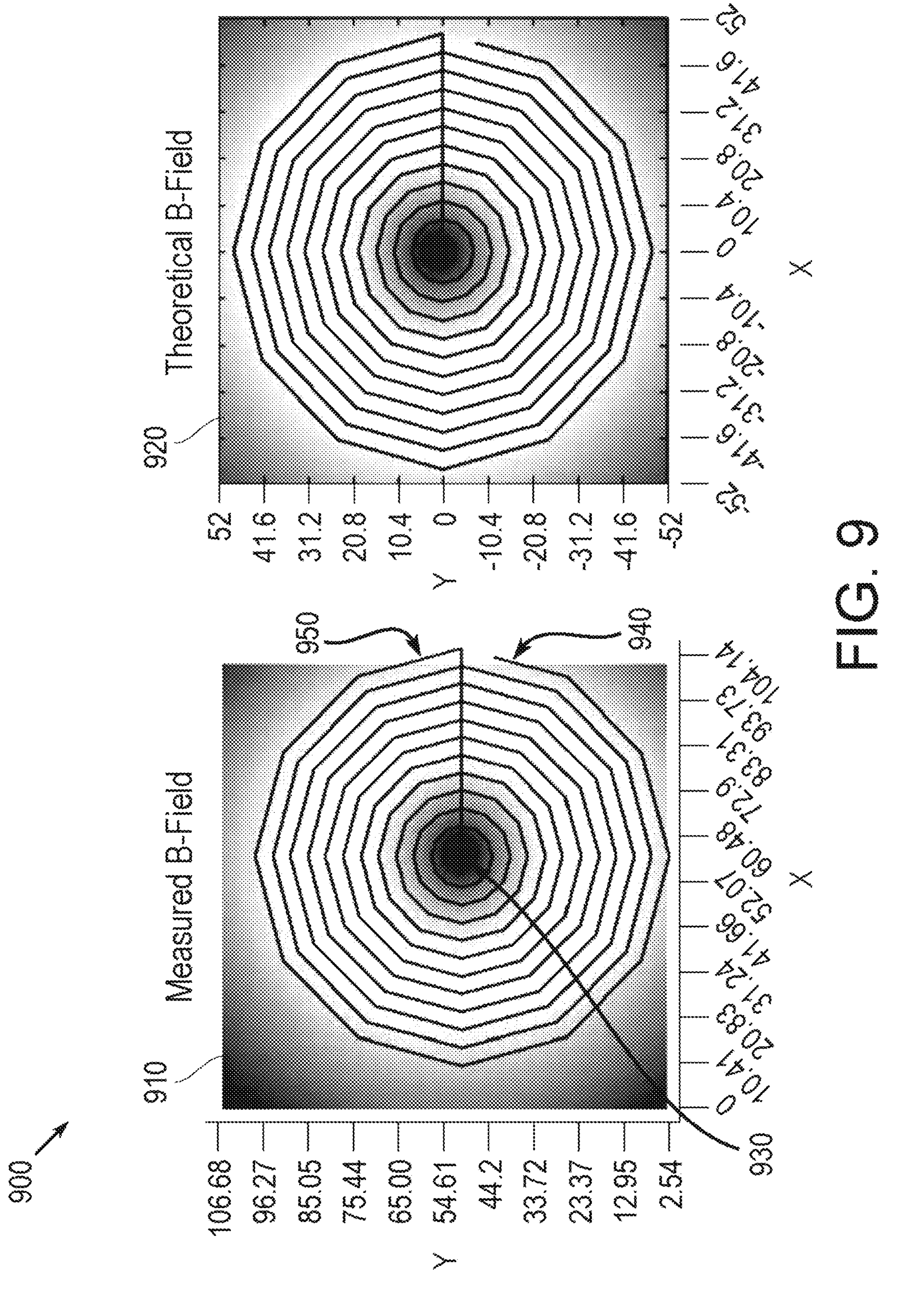
FIG. 9 is a pair of comparison views of spiral antenna responses—measured and theoretical—to a magnetic field.

FIG. 9 shows a plan view 900 of a circular spiral antenna configuration comparing a measured horizontal magnetic B-field 910 to a theoretical magnetic B-field 920 along X and Y distances. The patterns show similar characteristics. Note that the origin for the measurement is located in the lower left hand corner, while the origin for the theory is in the center 930. The spiral pattern exhibits a free end 940 and a shunt end 950.

Figure 10:
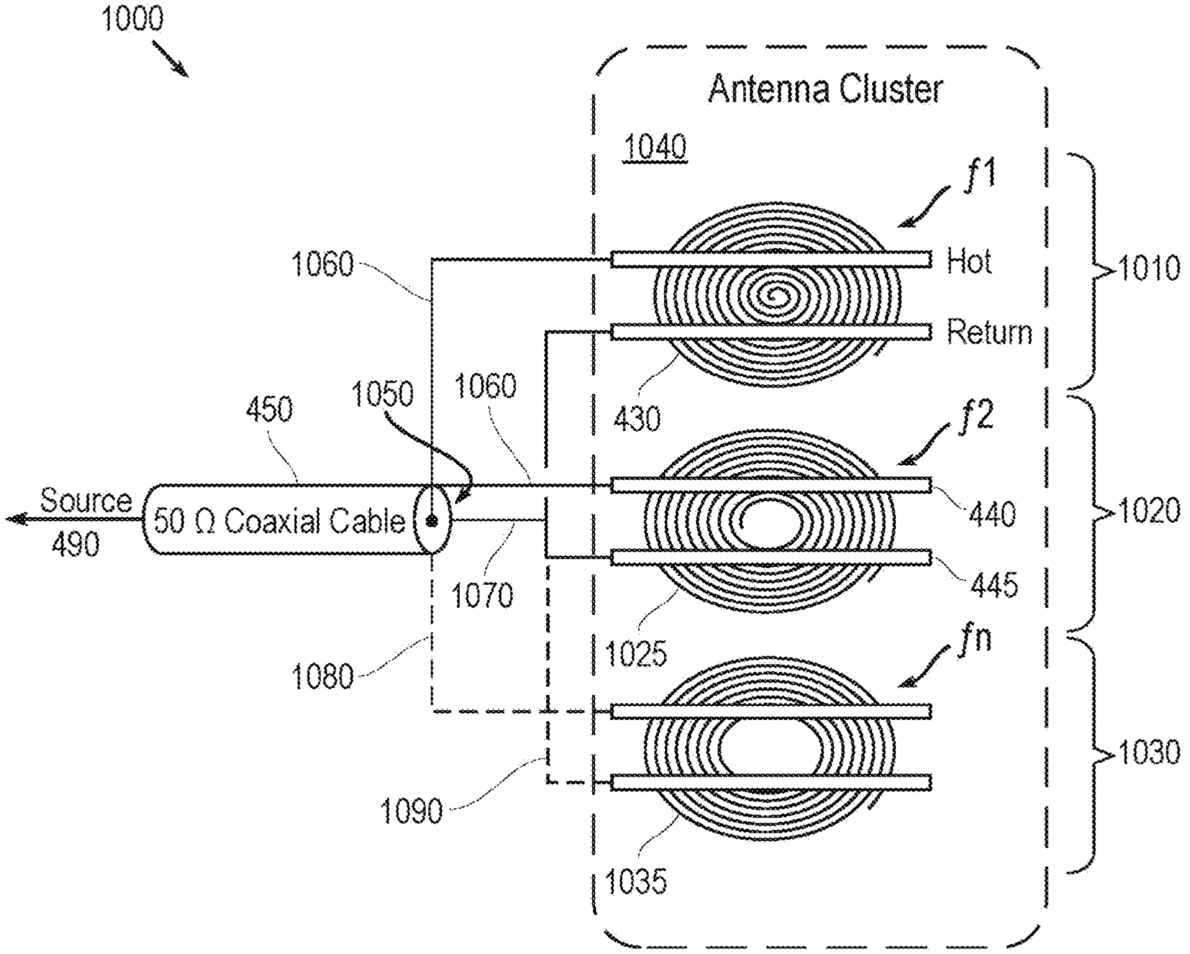
FIG. 10 is a diagram view of a series of spiral antennas joined to a coaxial cable.

FIG. 10 shows a schematic view 1000 of an antenna array numbered from 1, 2 . . . n as shown in view 400. This includes a first antenna 1010 with circular spiral wire 430 having natural frequency $f_1$, a second antenna 1020 with wire 1025 having natural frequency $f_2$, followed by additional units until an $n^{th}$ antenna 1030 with wire 1035 and natural frequency $f_n$ form an antenna cluster 1040.

Each spiral antenna 430, 1025 and 1035 have hot and return electrode terminals 440 and 445 on the first and second antennas 1010 and 1020 that respectively connect to an input terminal 1050 of the coaxial cable 450 that leads to the source 490. The hot electrodes 440 connect to the terminal 1050 via leads 1060, while return electrodes 445 connect to sheath ground via leads 1070. Similarly, for the remaining electrodes 1030, the leads 1080 and 1090 serve similar respective roles to the hot leads 1060 and return leads 1070.

Figure 11:
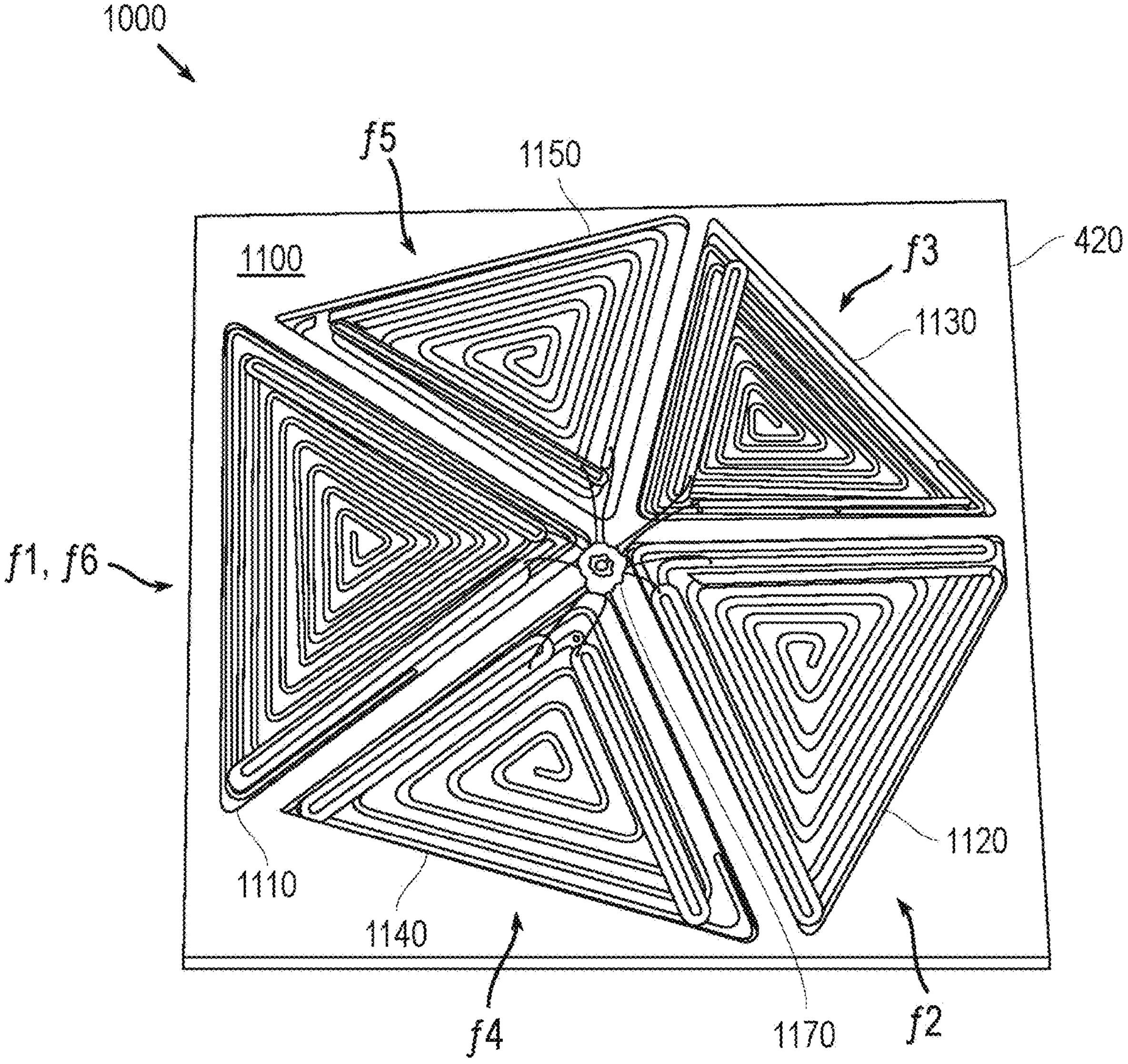
FIG. 11 is a photographic view of a set of triangular spiral.

FIG. 11 shows a photographic view 1100 of an antenna array comprising triangular spiral geometries. A first antenna 1110 (to the left) has natural frequencies $f_1$ and $f_6$. A second antenna 1120 (lower right) has natural frequency $f_2$. A third antenna 1130 (upper right) has natural frequency $f_3$. A fourth antenna 1140 (bottom) has natural frequency $f_4$. A fifth antenna 1150 (top) has natural frequency $f_5$.

These antennas arranged clockwise from 1130, 1120, 1140, 1110 and 1150 are disposed on a dielectric platform 420 and join to a single cable 450 at junction 1170. The antennas differ in numbers of loops, with the first 1110 and third 1130 featuring the tightest spiral geometries.

Figure 12:
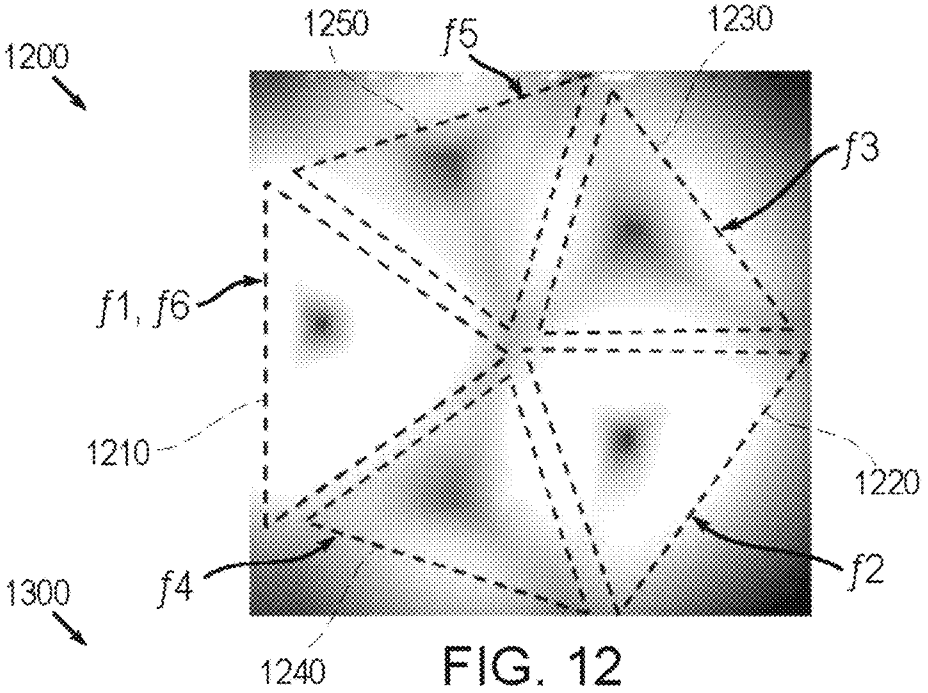
FIG. 12 is a photographic view of a set of spiral antenna responses to an electromagnetic field.

FIG. 12 shows a photographic view 1200 of horizontal magnetic field measurement responses for the antenna array in view 1100. Triangular demarcations for these responses correspond as follows: first response 1210 to antenna 1110, second response 1220 to antenna 1120, third response 1230 to antenna 1130, fourth response 1240 to antenna 1140 and fifth response 1250 to antenna 1250.

These responses feature a dark spot at the triangular spiral center representing low magnetic field values, becoming brighter towards their peripheries representing high magnetic field values. Antenna 1210 shows the greatest intensity for the first frequency.

Figure 13:
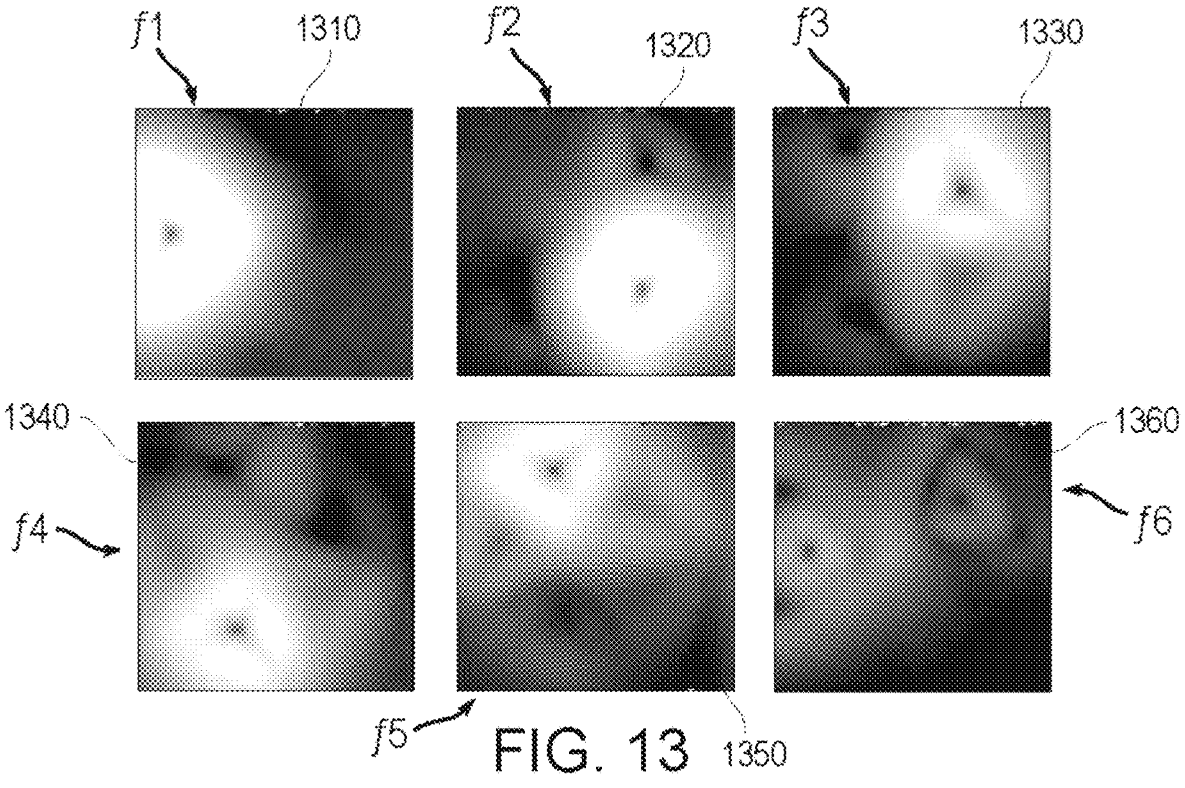
FIG. 13 is a set of photographic detail views of antenna responses.

FIG. 13 shows a photographic detail view 1300 of independent antenna horizontal magnetic field measurement responses. In particular, these include first frequency $f_1$ shown in image 1310, second frequency $f_2$ shown in image 1320, third frequency $f_3$ shown in image 1330, fourth frequency $f_4$ shown in image 1340, fifth frequency $f_5$ shown in image 1350 and sixth frequency $f_6$ shown in image 1360. These respective frequencies correspond to antennas 1110, 1120, 1130, 1140, 1150 and 1110 in view 1100. The combined field of these independent images comprise the image displayed in view 1200.

Figure 14:
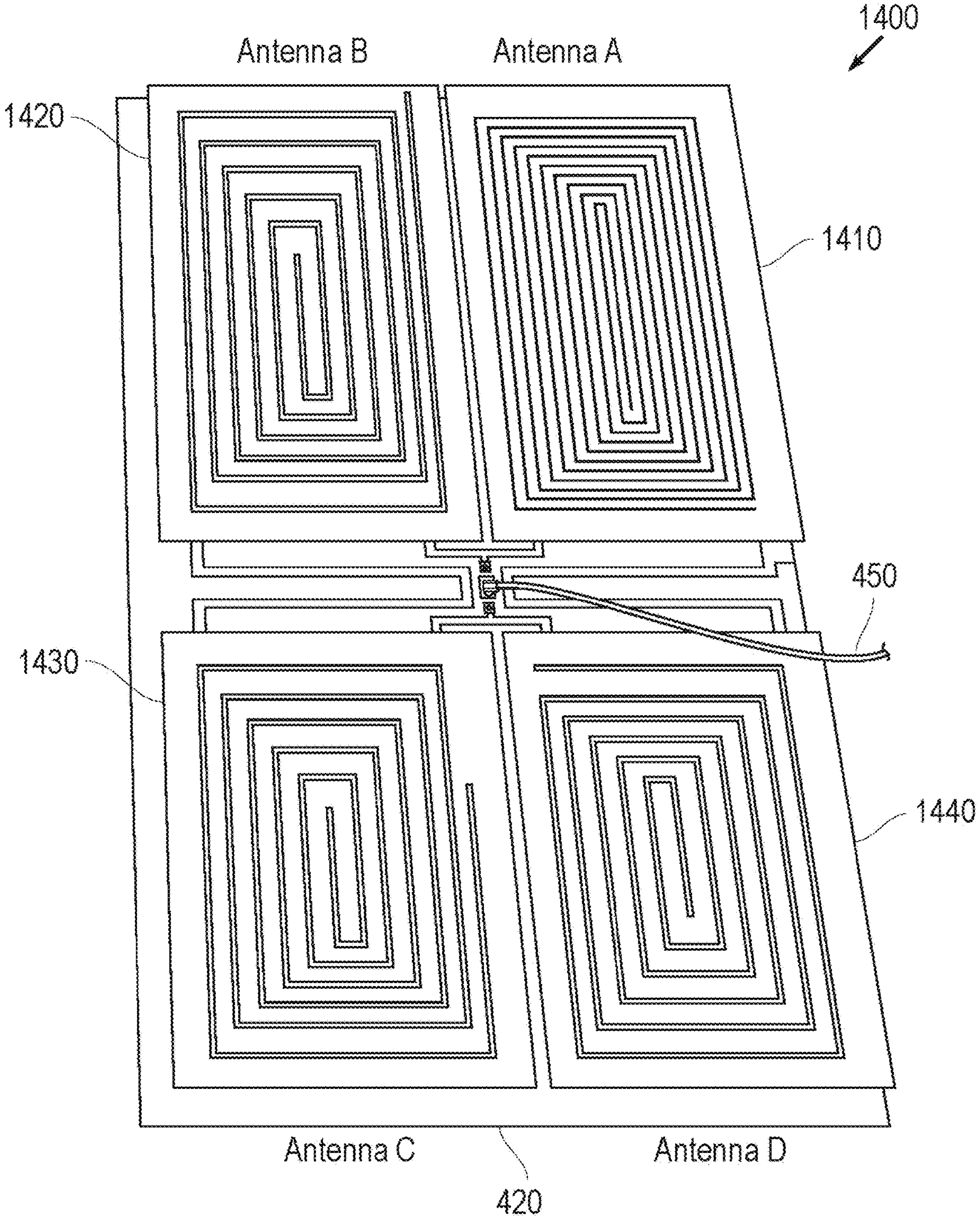
FIG. 14 is a photographic view of a set of spiral rectangular antennas.

FIG. 14 shows a photographic view 1400 of a four-antenna array with rectangular spiral geometries. These antennas are labeled A as 1410, B as 1420, C as 1430 and D 1440 disposed on a dielectric platform 420, which connects to a cable 450. The antennas A, B, C and D feature decreasing loop densities in sequence for responding to separate frequencies.

Figure 15:
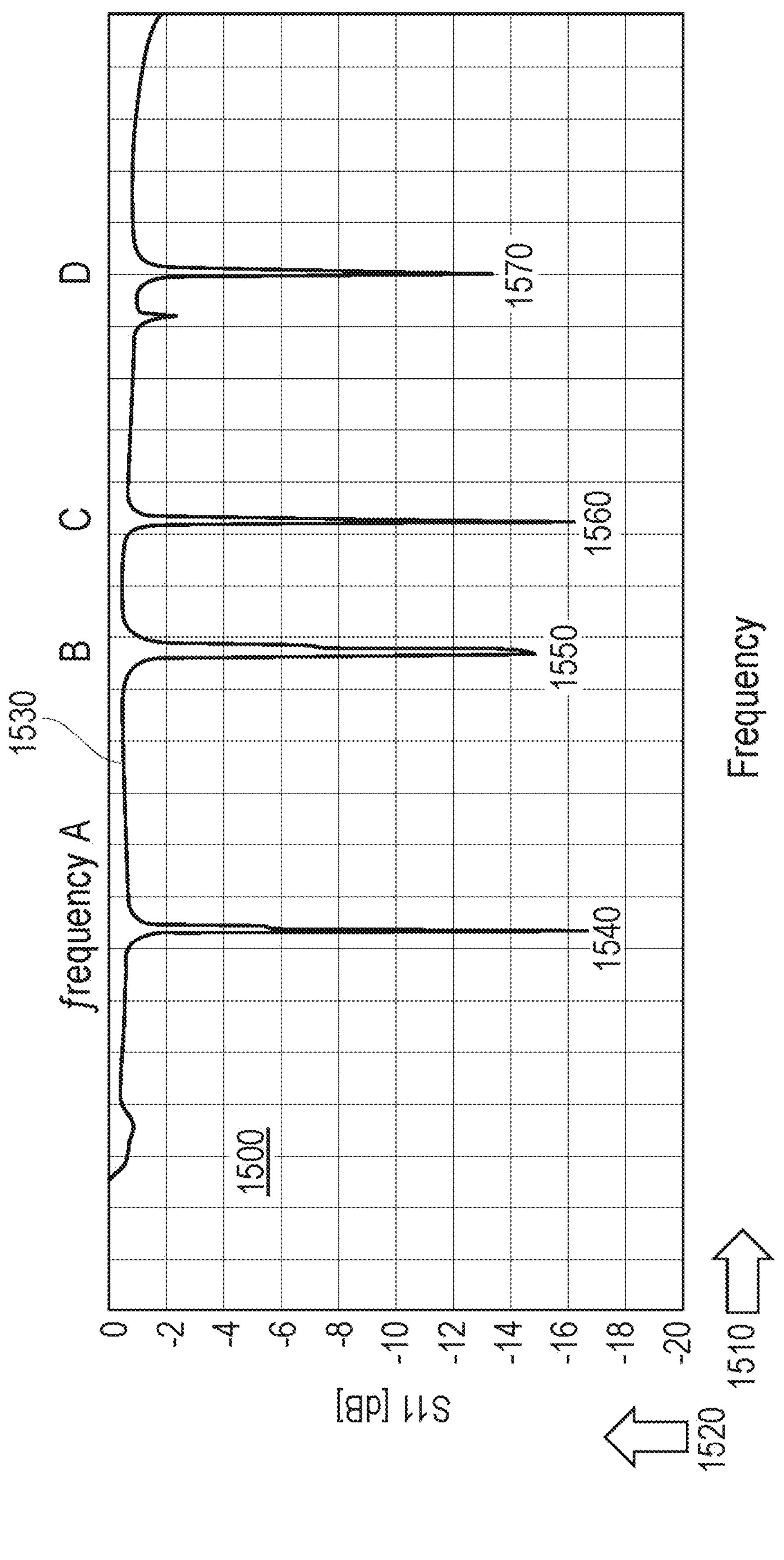
FIG. 15 is a graphical view of signal responses from the spiral rectangular antennas.

FIG. 15 shows a graphical view 1500 of signal response for the antenna array in view 1400. Frequency 1510 (arbitrary units) denotes the abscissa, while antenna signal 1520 (dB) represents the ordinate. The signal response indicated by line 1530 is the S11 response of the antenna, indicating how well its impedance is matched to the source. Negative response peaks are indicated by tuning at frequencies A at 1540, B at 1550, C at 1560 and D at 1570 for the respective antennas 1410, 1420, 1430 and 1440, all decreasing beyond—13 dB, constituting greater than 95% impedance match with the source.

Exemplary embodiments fulfill an antenna objective to produce a strong reactive field (specifically magnetic field) coupling between itself and targets of interest. Electrodes capacitively driving the spiral loop 430 in an open-ended spiral dipole antenna 410 produce an electric current distribution similar to a half-wave dipole antenna within a spiral antenna. Multiple antennas disposed abreast (i.e., side-by-side) with their own electrodes produce an antenna cluster 1040, where the input frequency passively determines which individual antenna element is radiating. Selection of this input frequency enables switching between spiral antenna elements.

Dahlgren engineers explored techniques to reduce the dependency between the impedance of the antenna and the placement of the cable and its balun by converting the cable-driven open loop antenna to a floating spiral antenna driven capacitively via tuning forks, or inductively via a loop connected to the output of the coaxial cable. The electric current distribution of an exemplary capacitively or inductively driven spiral antenna resembles a dipole antenna, and generates sensible magnetic fields at both the first and third harmonic.

Dahlgren engineers integrated this antenna concept onto its test system in 2020, and the system outperformed its predecessor from 2018. View 1100 displays a photograph of the antenna cluster used in 2020, which contains five individual capacitively coupled spiral antennas. View 400 displays a photograph and diagram of a capacitively coupled spiral dipole antenna 410.

The dipole electrodes 440 and 445 connect to the output (hot) 460 and return 470 of a coaxial cable 450 fed by the power source 490, e.g., amplifier, signal generator, etc. The electrodes 440 and 445 avoid electrical contact with the spiral antenna 430, but instead reside on top of a dielectric substrate 420 of defined thickness (typically a few centimeters) as spacers 480.

The dielectric substrate for the spacers 480 substantially comprise polypropylene $(C_3H_6)_n$ to conductively separate the spiral antenna 430 and the dipole electrodes 440 and 445. The antenna 430 mounts to a dielectric substrate 420, typically also polypropylene, which has a frequency-dependent dielectric constant ε in the natural frequency relation:

$$f_b \frac{(2b-1)}{4L} \cdot \frac{c}{\sqrt{\varepsilon}}, \tag{5}$$

based on eqn. (1) with L denoting the total length of the free-floating spiral antenna 430. The primary and tertiary frequencies are defined by b=1 and b=3, respectively. Polypropylene has advantages of low cost while maintaining low loss. Polyteltrafluoroethylene ($(C_2F_4)_n$ also known as Teflon) can serve as a higher cost alternative as the dielectric material, as can polycarbonate.

Thus, exemplary embodiments provide a reactively driven (inductive or capacitive) spiral antenna for enhanced magnetic field characterization. Such an antenna has been demonstrated for many military applications including detection and pre-detonation of detection of improvised explosive devices (IEDs) or disabling of electronics in vehicles.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A reactively driven open loop antenna with dipole current distribution for generating a sensible magnetic field and in association with a source terminal, said antenna comprising:

a dielectric substrate;

a driving element connecting to the source terminal;

a spiral antenna tuned to a natural frequency and disposed on said substrate; and a coaxial cable extending from said substrate to the source terminal, wherein said driving element connects to a capacitively driven pair of dipole electrodes, and said pair of dipole electrodes are disposed across and electrically isolated from said antenna, respectively connecting to the source terminal via said coaxial cable, and said dielectric substrate.

2. The antenna according to claim 1, wherein the source terminal drives an electrically conductive open loop conduit.

3. The antenna according to claim 1, wherein said antenna denotes a plurality of antennas tuned to separate corresponding frequencies.

4. The antenna according to claim 1, wherein said dielectric substrate is composed of a low loss dielectric material, such as polypropylene.

5. The antenna according to claim 1, wherein said spiral antenna is composed of an electrically conductive metal, such as aluminum.

* * * * *